US012784158B2

(12) United States Patent
Lopez Fernandez et al.

(10) Patent No.: US 12,784,158 B2
(45) Date of Patent: Nov. 3, 2026

(54) METHOD AND SYSTEM FOR INPAINTING OF COLOURISED THREE-DIMENSIONAL POINT CLOUDS

(71) Applicant: HEXAGON INNOVATION HUB GMBH, Heerbrugg (CH)

(72) Inventors: Luis Lopez Fernandez, Goldach (CH); Bernhard Metzler, Dornbirn (AT)

(73) Assignee: HEXAGON INNOVATION HUB GMBH, Heerbrugg (CH)

( * ) Notice: Subject to any disclaimer, the term of this patent is extended or adjusted under 35 U.S.C. 154(b) by 225 days.

(21) Appl. No.: 18/654,612

(22) Filed: May 3, 2024

(65) Prior Publication Data

US 2024/0370979 A1 Nov. 7, 2024

(30) Foreign Application Priority Data

May 5, 2023 (EP) .................................... 23171796

(51) Int. Cl.
*G06T 5/77* (2024.01)
*G06T 5/60* (2024.01)

(52) U.S. Cl.
CPC .................. *G06T 5/77* (2024.01); *G06T 5/60* (2024.01); *G06T 2207/10028* (2013.01); *G06T 2207/20084* (2013.01)

(58) Field of Classification Search
CPC ... G06T 5/77; G06T 5/60; G06T 2207/10028; G06T 2207/20084; G06T 19/20; G06T 2210/56; G06T 2219/2012; G06T 15/50
See application file for complete search history.

(56) References Cited

U.S. PATENT DOCUMENTS

2020/0151512 A1* 5/2020 Corral-Soto .......... G06F 18/217
2020/0334895 A1* 10/2020 Skotheim ................ G06T 7/521
(Continued)

FOREIGN PATENT DOCUMENTS

CN 115937842 A * 4/2023
EP 3 373 251 A1 9/2018
(Continued)

OTHER PUBLICATIONS

Rotstein et al., Colored Point Cloud to Image Alignment, 2021, arXiv:2110.03249v1, pp. 1-11. (Year: 2021).*
(Continued)

*Primary Examiner* — Kathleen M Broughton
(74) *Attorney, Agent, or Firm* — Maschoff Brennan

(57) ABSTRACT

A computer-implemented method and computer system for colourising a 3D point cloud of a setting, the method comprising acquiring point cloud data and image data of the setting, wherein the point cloud data comprises coordinates and an intensity value for each point of the point cloud, and the image data provides colour information of the setting, wherein the method further comprises combining the intensity values and the colour information in a common aligned space, identifying points of the point cloud and/or pixels in the image data that are affected by content discrepancies or anomalies between the colour information and the point cloud data, a neural network deriving, for each of the identified points and/or pixels, colourising information from joint evaluation of the combined intensity values and colour information, and assigning to each of the identified points and/or pixels, the respective colourising information.

20 Claims, 5 Drawing Sheets

(56) References Cited

U.S. PATENT DOCUMENTS

| | | | | |
|---|---|---|---|---|
| 2020/0342652 | A1* | 10/2020 | Rowell | G06V 10/82 |
| 2020/0349761 | A1* | 11/2020 | Zhang | G06T 15/10 |
| 2021/0042997 | A1* | 2/2021 | Vechersky | G06T 7/20 |
| 2021/0321016 | A1* | 10/2021 | Flohr | H04N 1/465 |
| 2022/0091266 | A1 | 3/2022 | Sivakumar | |
| 2023/0245409 | A1* | 8/2023 | Ui | G06T 19/20<br>345/419 |

FOREIGN PATENT DOCUMENTS

| | | | |
|---|---|---|---|
| EP | 3 351 899 | B1 | 6/2020 |
| EP | 3 944 183 | A1 | 1/2022 |
| EP | 4 224 430 | A1 | 8/2023 |

OTHER PUBLICATIONS

Extended European Search Report dated Oct. 4, 2023 as received in Application No. 23171796.8.

* cited by examiner

METHOD AND SYSTEM FOR INPAINTING OF COLOURISED THREE-DIMENSIONAL POINT CLOUDS

CROSS-REFERENCE TO RELATED APPLICATION

This patent application claims the priority and benefit of European Patent Application No. 23171796.8 filed May 4, 2023, which application is incorporated herein by specific reference in its entirety.

BACKGROUND

The present disclosure relates to a method and a system for inpainting colourised three-dimensional point clouds.

Generating three-dimensional point clouds is used to survey many different settings such as construction sites, building façades, industrial facilities, interior of houses, or any other applicable setting. The surveys achieved therewith may be used to obtain accurate three-dimensional (3D) models of a setting, wherein the models comprise point clouds. The points of such a cloud are stored as coordinates in a coordinate system, which may be defined by a surveying instrument which recorded the point cloud. Usually, the surveying instrument constitutes the origin of the coordinate system by an instrument centre, in particular by the so-called nodal point of the surveying instrument. The points are usually surveyed by associating a distance measured with a laser beam (with help of a time-of-flight method) with the alignment under which the distance was measured. Usually, the coordinate system is a spherical coordinate system, such that a point is characterised by a distance value, an elevation angle and an azimuth angle with reference to the origin of the coordinate system.

Common surveying instruments comprise a unit for sending out a scanning beam and for receiving the reflected beam in order to measure the distance of a point the beam was directed at. Usually, these surveying instruments furthermore comprise means to rotatably alter the direction of the beams, commonly a vertical rotation axis and a horizontal rotation axis, wherein both axes are sensed with angle sensors. Usually, the rotation of the vertical axis is measured by an azimuth angle and the rotation of the horizontal axis is measured by an elevation angle. If the surveying instrument is embodied as a laser scanner, one of said axes may be a slow axis and the other one a fast axis.

The distances may be calculated with the travel time measurement (time-of-flight) method by observing the time between sending out and receiving a signal. The alignment angles are achieved with said angle sensors arranged at the vertical axis and at the horizontal axis.

In the field of surveying, providing colourised 3D point clouds is a desired feature, e.g. for LiDAR based surveying tools. Colour features facilitate the understanding and navigation through the scene, as well as the identification of elements of interest, thereby providing a more "friendly" product to the human vision system, than uncoloured point clouds. In addition, colour features are widely used as input features for many state-of-the-art point cloud post-processing algorithms like segmentation, classification and/or modelling algorithms.

In order to provide a better visualization, the point cloud may be digitally colourised. In various applications, terrestrial surveying is hence supported by imaging data of at least one RGB sensor, e.g. a camera, which is combined with a surveying instrument by including the camera in the instrument or mounting it on the same platform as the instrument.

Often, RGB sensors, such as cameras, are provided on the same device as the LiDAR in order to provide the colour information used for colourizing the point cloud. However, the LiDAR and RGB sensors are usually installed at different locations on the device for practical reasons and, thus, not aligned. This way, disadvantageously, each sensor captures the reality from a different point of view, and the deviation on the point of view between LiDAR and RGB sensors may create artificial occlusions due to parallax effect and subsequently lead to wrong RGB features being assigned to the LiDAR point cloud.

Some LiDAR measurement systems integrate simultaneous location and mapping (SLAM) and/or additional positioning technologies that enable dynamic use of those devices. This way, for measuring and reconstructing the 3D scene along a dynamic trajectory the LiDAR can be carried by an operator or be mounted to a transport platform, e.g. an unmanned ground vehicle (UGV). Although those devices acquire LiDAR and RGB imagery synchronously, the sampling rates of LiDAR and RGB sensors are significantly different. This creates an additional misalignment between the observation points of the LiDAR and the RGB sensor, more critical in this case as the deviations are depending not only on the design of the measurement device, but also on the displacement velocity of the carrier. This way, disadvantageously, the presence of RGB projection artifacts due to the parallax effect potentially is even more severe.

Additionally, in some applications LiDAR and RGB acquisitions are performed asynchronously, i.e. one after the other. LiDAR measurement systems usually comprise a single measurement sensor. In order to be able to measure a wide area, the LiDAR measurement system needs to be mechanically pointed towards different directions, usually covering 360 degrees of the scene. That implies a continuous movement of the device along two independent axes (horizontal and vertical). The acquisition of imagery with RGB sensors can be affected qualitatively by those displacements, decreasing the quality of the images. To eliminate this effect, LiDAR and RGB acquisitions may be acquired sequentially, delaying the start of the acquisition with one sensor (e.g. the RGB sensor) until the acquisition with the complementary sensor (e.g. the LiDAR unit) is finished. Thus, disadvantageously, moving obstacles present in the scene (i.e. moving between the sensor and the scene) may lead to significant RGB projection artifacts. For instance, if a moving object is only present in the scene while the RGB data is acquired, but not while the LiDAR data is acquired, RGB features of the object will be projected to other locations of the point cloud, i.e. to locations that—from the point-of-view of the camera—are behind this object.

EP 3 351 899 B1 discloses a method that uses inpainting for applying colour to those regions of 3D point clouds in which regions no reliable RGB colour from the RGB imagery can be assigned to a point due to an obstruction of the point caused by the parallax between LiDAR and camera. An algorithm for identifying these particular regions is implemented including the use of 3D data. In case no matching colour is available for a scan point, it is coloured based on or by a colour from surrounding points. The colour may be estimated based on a distance or an intensity of the uncoloured 3D point and the adjacent coloured points. However, in some cases this approach may lead to incorrect or inaccurate colour assignment. Also, this approach cannot be used for other obstructions, e.g. due to moving persons or objects in the area.

SUMMARY

It would be desirable to provide a method that overcomes the problems of the prior art, i.e. that allows an improved inpainting in case that the obstruction is caused by the parallax between LiDAR and RGB sensors, and/or that allows an improved inpainting in case that the obstruction is due to a moving obstruction, e.g. a person or object.

It is therefore an object of the present disclosure to provide an improved method and system for colourisation of a point cloud.

It is another object to provide such a method and system that allow improved inpainting to provide synthetic but reliable and accurate RGB features (i.e. colour information) where significant content discrepancies between RGB and Lidar are present in the raw data.

It is a particular object to provide such a method and system that allow an improved inpainting in case of a moving object obstructing a line of sight.

It is another particular object to provide such a method and system that allow an improved inpainting in case of bad lighting conditions.

A first aspect pertains to a computer-implemented method for colourising a 3D point cloud of a setting, the method comprising acquiring point cloud data and image data of the setting, wherein the point cloud data comprises coordinates and an intensity value for each point of the 3D point cloud, and the image data is acquired by a digital camera and provides colour information of the setting. The method further comprises

- combining the intensity values and the colour information in a common aligned space;
- identifying points of the point cloud data and/or pixels in the image data that, which points and/or pixels are affected by content discrepancies or anomalies between the colour information and the point cloud data;
- deriving, by a neural network, for each of the identified points or pixels, respectively, colourising information from joint evaluation of the combined intensity values and colour information;
- assigning to each of the identified points or pixels, respectively, the respective colourising information.

For instance, assigning the colourising information may comprise replacing an incorrectly assigned colour or providing colour to portions that lack colour information.

According to some embodiments, the method further comprises projecting the assigned colourising information to point-cloud space, to camera space or both.

According to some embodiments, the method further comprises determining the content discrepancies or anomalies based on the combined intensity values and colour information. These content discrepancies or anomalies may be caused by incorrectly assigned colours in the image data, e.g. due to bad lighting conditions while the image data is acquired. For instance, bad lighting conditions comprise shadows, reflections, overexposures and/or underexposures in the captured image data or parts thereof.

According to one embodiment of the method, the point cloud data and the image data of the setting are acquired with a surveying instrument, such as a laser scanner, the surveying instrument comprising a LiDAR unit and at least one digital camera.

According to one embodiment, the method is performed by a computer of the surveying instrument, the computer comprising the neural network. For instance, the computer may also be configured to control the LiDAR unit and the at least one digital camera.

According to some embodiments of the method, acquiring the point cloud data of the setting comprises acquiring point cloud data of a first portion of the setting, wherein a line of sight of the digital camera to the first portion is blocked when acquiring the image data. In this case, points of the point cloud data that have been acquired in the first portion may be identified as the points (or a subset of the points) of the point cloud data that are affected by content discrepancies or anomalies between the colour information and the point cloud data.

According to some embodiments, the LiDAR unit and the digital camera are provided at different locations on the surveying instrument, wherein the line of sight of the digital camera to the first portion of the setting is blocked (also) due to these different locations, particularly due to a parallax shift between an instrument centre of the LiDAR unit and a projection centre of the digital camera.

According to another embodiment of the method, the point cloud data and the image data of the setting are acquired sequentially, wherein the line of sight of the digital camera to the first portion of the setting is blocked due to an obstruction between the camera and the setting, particularly wherein the obstruction is a moving object or person.

According to some embodiments of the method,

- the image data is acquired as a three-channel RGB image;
- combining the intensity values and the colour information in a common aligned space comprises generating a one-channel intensity image by means of projection of the intensity values;
- a multi-channel image is generated by adding the one-channel intensity image as an additional channel to the three-channel RGB image; and
- the multi-channel image is input to the neural network, wherein pixels that are affected by content discrepancies or anomalies are identified based on the multi-channel image.

Acquiring a three-channel RGB image optionally may include initially capturing a different kind of image data and converting it to RGB data using an imaging pipeline. For instance, a Bayer pattern may be captured that is converted to a three-channel RGB image ("De-Bayering").

Alternatively, the image data may be acquired as an infrared (IR) image or as an image comprising an IR channel, e.g. in addition to RGB channels. The image data may also be captured as a multispectral image comprising a plurality of channels for different wavelengths (particularly including ultraviolet (UV) and/or IR wavelengths), e.g. in addition to RGB channels. The colourising information may then comprise the colours/values for the respective wavelengths (e.g. UV and/or IR values).

According to one embodiment, a mask value is encoded for a subset of pixels of the three-channel RGB image, the mask value indicating a presence of significant content discrepancies or anomalies between the colour information and the point cloud data.

According to another embodiment, the assigned colourising information is projected to point-cloud space, camera space or both by outputting a three-channel in-painted image.

According to some embodiments,

- a precomputed inpainting mask is provided, wherein the precomputed inpainting mask provides a mask value for a subset of pixels of the three-channel RGB image, the mask value indicating a presence of significant content discrepancies or anomalies between the colour information and the point cloud data;

a multi-channel image is generated by adding the one-channel intensity image and the precomputed inpainting mask as additional channels to the three-channel RGB image, wherein the multi-channel image is input to the neural network; and the pixels that are affected by content discrepancies or anomalies are identified based (also) on the mask values.

According to another embodiment of the method, combining the intensity values and the colour information in a common aligned space comprises generating a coloured point cloud by mapping colour information from the image data, e.g. from a three-channel RGB image, onto the points of the point cloud; and the coloured point cloud is input to the neural network, wherein identifying the points is based on the coloured point cloud.

Optionally, the assigned colourising information is projected to point-cloud and/or camera spaces, i.e. outputting an in-painted point cloud.

According to some embodiments, the colour information from the image data, e.g. from a three-channel RGB image, is input to an image-segmentation neural network, the image-segmentation neural network outputting a segmentation mask;

combining the intensity values and the colour information in a common aligned space comprises generating a coloured point cloud by mapping the colour information from the image data and the segmentation mask onto the points of the point cloud, wherein coloured point cloud is input to the neural network;

the generated inpainting mask provides a mask value for each pixel of the image data, the mask value indicating a likelihood for the presence of significant content discrepancies or anomalies between the colour information and the point cloud data, for instance from moving obstacles; and identifying the pixels that are affected by content discrepancies or anomalies is based on the mask values.

According to one embodiment, the coloured point cloud comprises, for each point, at least three-dimensional coordinates, an intensity value and RGB colour information. Optionally, the coloured point cloud further comprises, for each point, a mask value of the inpainting mask.

According to another embodiment of the method, the points of the point cloud data that are affected by content discrepancies or anomalies are identified by the neural network based at least on the intensity values and the colour information. Additionally or alternatively, the point cloud data may comprise a signal-to-noise-ratio value for each point of the 3D point cloud. Optionally, the neural network may identify the points of the point cloud data that are affected by content discrepancies or anomalies also based on the signal-to-noise-ratio values or derive the colourising information from joint evaluation of the projected coordinates, intensity values, colour information and signal-to-noise-ratio values.

A second aspect pertains to a computer system that is configured for performing the method for colourising a three-dimensional point cloud of a setting according to the first aspect.

According to some embodiments, the computer system comprises a surveying instrument, such as a laser scanner, the surveying instrument comprising a LiDAR unit and at least one digital camera and being configured to acquire the point cloud data and the image data of the setting.

According to some embodiments, a computer of the surveying instrument comprises the neural network and is configured to perform the method. Optionally, this computer may be configured to control the LiDAR unit and the at least one digital camera.

A third aspect pertains to a computer program product comprising program code which is stored on a machine-readable medium, or being embodied by an electromagnetic wave comprising a program code segment, and having computer-executable instructions for performing the method according to the first aspect, particularly when being executed in a computer system according to the second aspect.

BRIEF DESCRIPTION OF THE DRAWINGS

In the following, the disclosure will be described in detail by referring to exemplary embodiments that are accompanied by figures, in which.

DETAILED DESCRIPTION

Figure 1:
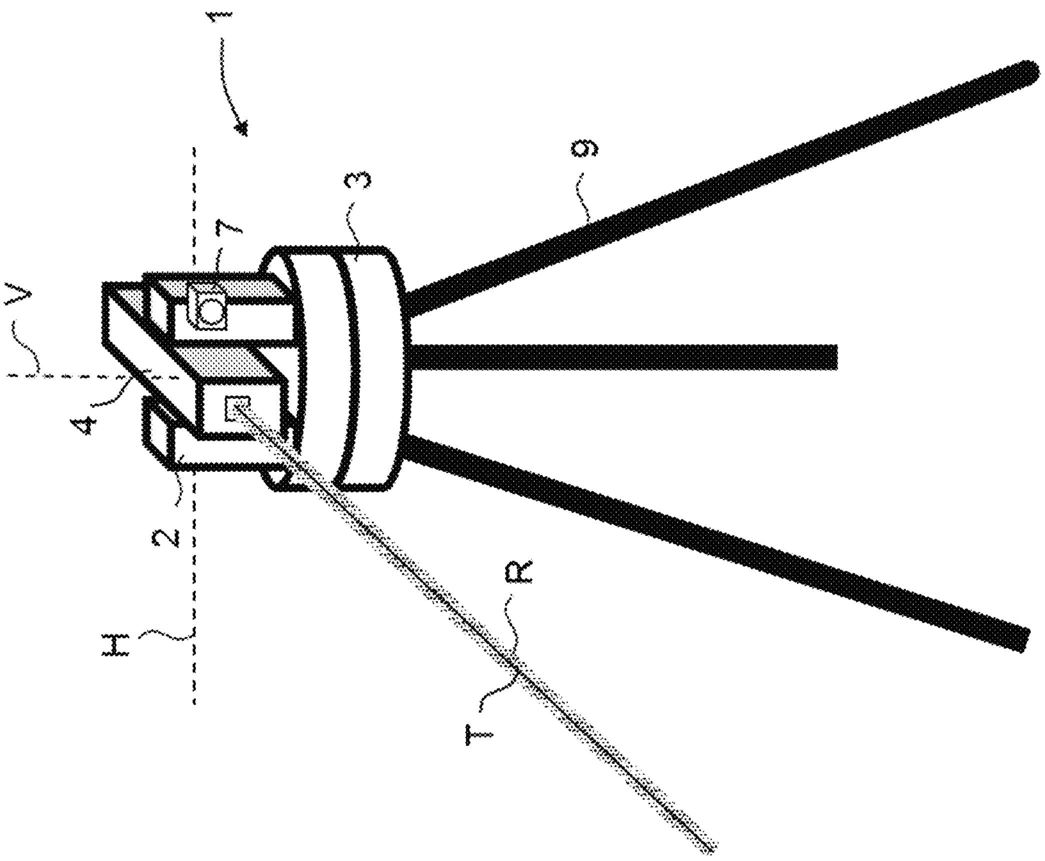
FIG. 1 shows an exemplary embodiment of a surveying instrument.

FIG. 1 shows an exemplary surveying instrument 1 mounted on a tripod 9. The instrument 1 has a base 3 on which a body 2 is mounted such that it is rotatable about an azimuth axis (or vertical axis) V. A beam directing unit 4 is mounted in the body 2 such that it is rotatable about an elevation axis (or horizontal axis) H. A camera 7 is attached to or integrated in the surveying instrument 1. The beam directing unit 4 comprises an emitting unit for providing (emitting) a transmission beam T and a detection unit for detecting (receiving) a reception beam R.

A computer (not shown here) for controlling the components of the instrument 1 and for performing a method may be integrated into the instrument 1, e.g. within the body 2. Alternatively, an external computer may be connected to the instrument 1, e.g. by means of a cable or a wireless data connection.

Figure 2:
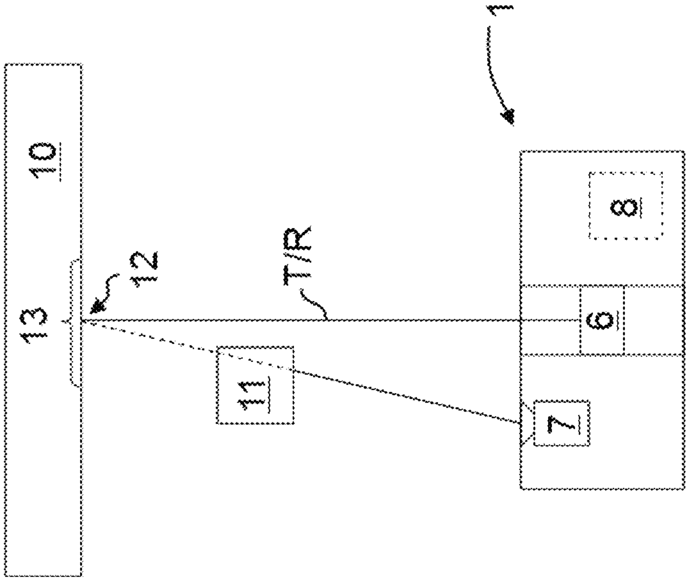
FIG. 2 shows a schematic drawing of the parallax problem solved by the disclosure.

FIG. 2 illustrates the general problem of misassignment of a pixel to a point of a 3D point cloud. In this example, the surveying instrument 1 may be configured as a laser scanning device using LiDAR ("laser imaging, detection and ranging" or "light detection and ranging"). A LiDAR unit 6 of the device comprises an emitting unit, a receiving unit and a beam directing unit.

Similarly to the example of FIG. 1, a controlled, motorised relative rotation between a body and a base may be provided around an azimuth axis V. Additionally, the beam directing unit of the LiDAR device 6 is mounted in a body such that it is rotatable around an elevation axis H by a motor (not shown). While rotating, the directing unit directs a transmission beam T coming from the emitting unit towards a setting 10, and a reception beam R coming back from the setting 10 towards the receiving unit.

At least one camera 7, e.g. a wide-angle camera, panoramic camera, a spherical camera or similar, is provided on the laser scanner 1. The camera 7 may be mounted at the housing or to the base 3 or to the tripod 9, as long as there is a defined or determinable pose (=position and orientation) difference between the LiDAR unit 6 and the camera 7.

In the shown example, a computer 8 is integrated into the laser scanner 1. The computer may, however, also be external to the laser scanner 1, e.g. embodied by a cloud computer having permanent wireless connection to the laser scanner. The computer 8 is configured to control the mentioned components of the surveying instrument and to perform the steps of the method.

When the LiDAR unit 6 targets an exemplary point 12 of the setting 10, and the camera 7 tries to capture the same point, it fails to do so due to an obstacle 11. Consequently, without correction, a pixel of the obstacle 11 would be mistakenly assigned to the point 12, thus leading to a content discrepancy between LiDAR measurement and RGB image.

Figure 3C:
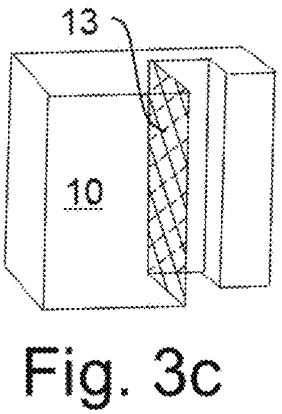
FIGS. 3*a-c* illustrate the different perspectives of a camera and a LiDAR unit caused by the parallax shift.
Figure 3A:
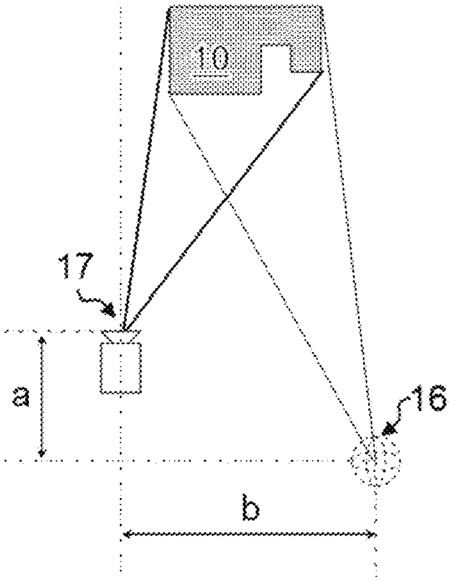

As illustrated in FIG. 3*a*, this misassignment problem is caused by the parallax shift between the instrument centre 16 of the LiDAR unit and the projection centre 17 of the camera. The instrument centre 16 may also be referred to as "nodal point" and defined as the origin of an instrument coordinate system within which the point cloud is recorded. The projection centre 17 is the vertex of the camera's angle of view—also referred to as entrance pupil or "no-parallax point". In the shown example, the parallax shift is two-dimensional and defined by line segments "a" and "b". Of course, the parallax may as well be three-dimensional. Alternatively, the parallax shift may also be defined by a single line segment connecting the nodal point 16 and the projection centre 17, wherein this connecting line segment may be expressed by a distance value, an azimuth angle and an elevation angle with reference to a coordinate system of the scanner 1 that has the nodal point 16 as its origin.

Because the LiDAR unit and the camera "perceive" the setting 10 from different viewing angles, there may be points visible to one of them, but not to the other, and vice-versa. This is shown in FIGS. 3*b* and 3*c*.

Figure 3B:
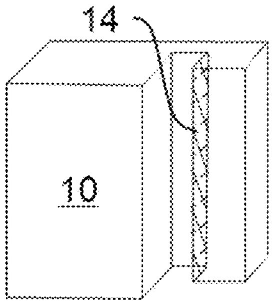

The shaded surface of the setting 10 in FIG. 3*b* is not captured by the point cloud and therefore unknown to the LiDAR unit. The shaded surface of the setting 10 in FIG. 3*c* is not captured by the image and therefore unknown to the camera.

Of course, content discrepancies or anomalies between LiDAR measurements and RGB images due to incorrectly assigned colours may also have other reasons than misalignment or obstacles. For instance, bad lighting conditions may negatively affect the acquired image data. Poorly lit rooms as well as direct sunlight (especially when combined) may lead to bad lighting conditions by casting shadows and reflections, or by causing over- and underexposed pixels in the captured image data. Thus, depending on the lighting conditions, in the image data, a uniformly coloured and/or evenly patterned straight wall may appear as having several differently coloured and/or patterned sections.

Figure 4:
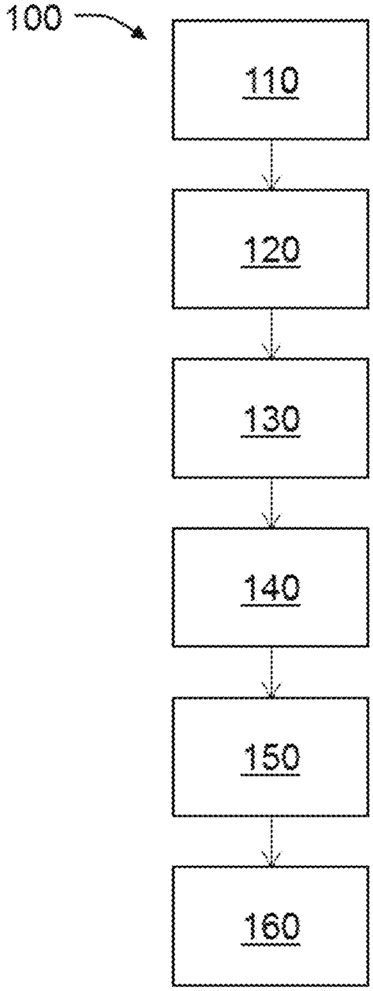
FIG. 4 shows a flowchart illustrating steps of exemplary embodiments of a method.

FIG. 4 is a flowchart illustrating steps of an exemplary embodiment of a method 100 for LiDAR-guided RGB inpainting in case of content discrepancies or anomalies between LiDAR measurements and RGB images. LiDAR-guided inpainting provides both a colorized point cloud without colour projection aberrations and a reliable metric RGB image where the objects are sharply defined and each pixel corresponds accurately with measured 3D point in the point cloud.

RGB stands for the initials of the three additive primary colours, red, green, and blue of an additive colour model of the image data that provides colour information. Of course, the colour information could be provided by the image data in other ways, e.g. with other colour models, as well.

In the illustrated embodiment, the method 100 comprises the following steps:

1. acquiring 110 LiDAR and RGB data with or from a measuring system, e.g. a terrestrial laser scanner, a mobile mapping system, or a handheld scanner comprising a camera;
2. combining 120 LiDAR features (including intensity) and RGB data in a common aligned space (e.g. by projection);
3. identifying 130 content discrepancies or anomalies;
4. deriving 140 a synthetic RGB colour from joint evaluation of RGB and LiDAR features;
5. replacing 150 the raw RGB colour by the synthetic RGB colour in identified areas (or assigning the synthetic RGB colour in identified areas without colour); and
6. projecting 160 the corrected RGB colour to 3D point cloud and RGB camera spaces.

The method 100 integrates image processing algorithms to reconstruct colour in areas with incorrectly assigned, missing or deteriorated colour, thereby preserving the real structure of the measured element.

For identifying 130 the content discrepancies or anomalies, 3D points and corresponding image pixels, which are affected by parallax or other obstructions, may be detected using projective geometry. The 3D points and corresponding image pixels may then be corrected by replacing 150 the wrongly assigned colour information with synthetic RGB colour information derived 140 by joint evaluation of RGB and LiDAR features, i.e. intensity, range/distance, and/or signal-to-noise ratio of the reflected laser light from the corresponding 3D points.

Optionally, identifying 130 those points of the point cloud data and/or those pixels in the image data that are affected by content discrepancies or anomalies may comprise determining said content discrepancies or anomalies based on the combined intensity values and colour information. Advantageously, this allows identifying also those content discrepancies or anomalies that are not effected by parallax or obstructions, but instead are effected, e.g., by bad lighting conditions while acquiring the image data.

Using the disclosed method 100, both, "image-based" and "point-cloud-based" approaches may be used to receive inpainted images and inpainted point clouds. FIGS. 5 to 8 illustrate exemplary embodiments of a method involving exemplary "image-based" and "point-cloud-based" approaches.

Figure 5:
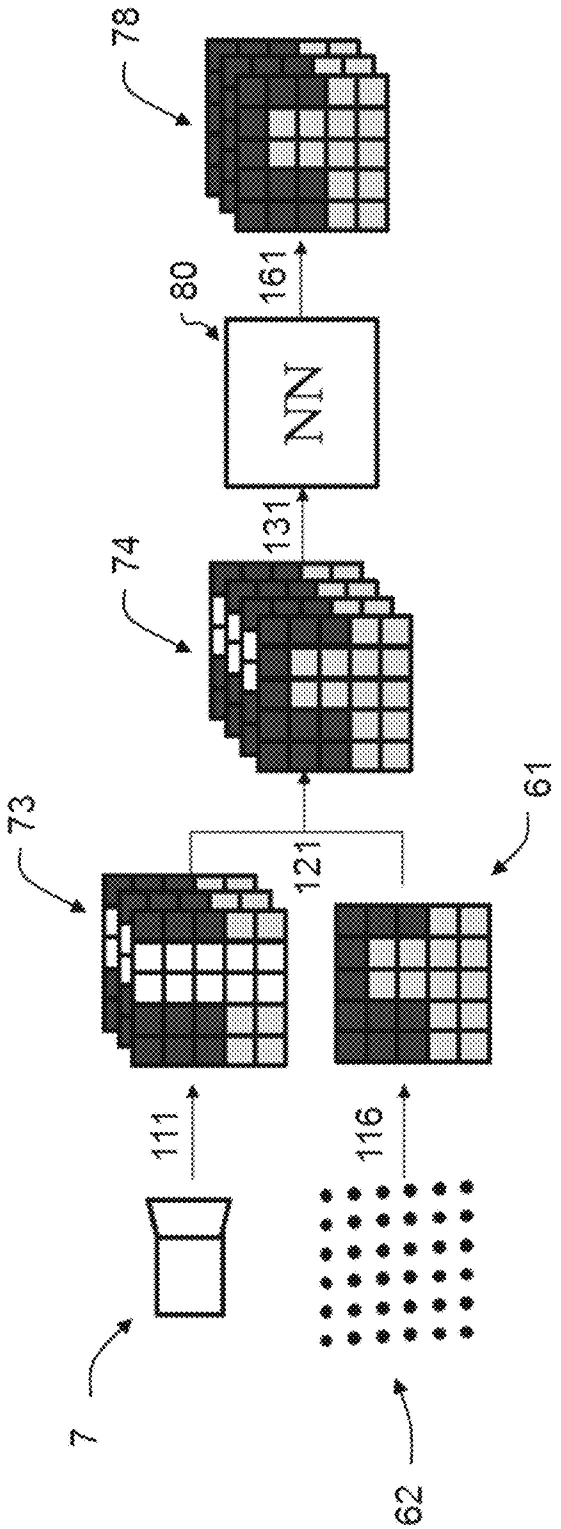
FIG. 5 illustrates a first exemplary embodiment of a method.

In the first embodiment illustrated in FIG. 5, the process comprises LiDAR-guided image inpainting and is based on the idea of automating the detection of content discrepancies or anomalies and computing a synthetic colour to in-paint the inconsistent areas in the RGB space before propagating the RGB colour to the LiDAR point clouds.

The RGB camera 7 provides 111 a three-channel RGB image 73 and the LiDAR unit provides scanning data with intensity values 62, from which a one-channel intensity image 61 is generated 116 by means of projection.

Since the LiDAR unit provides scanning data with range value (distance), optionally also a one-channel range image may be generated by means of projection, and the intensity images can be combined with this range image. This allows defining sharp edges even if the intensity responses between background and foreground should be matching.

The colour and intensity from the images 73, 61 are mapped 121 onto a multi-channel image 74. Each pixel in this four-channel image is thus stored with four values, including values for the colour (R, G and B) and the LiDAR intensity (I).

In the case that also a one-channel range image has been generated, also range can be mapped onto the multi-channel image 74, so that a five-channel image results. Each pixel in this five-channel image is stored with five values including values for the colour (R, G and B), the LiDAR intensity (I) and the LiDAR range (D).

Figure 8:
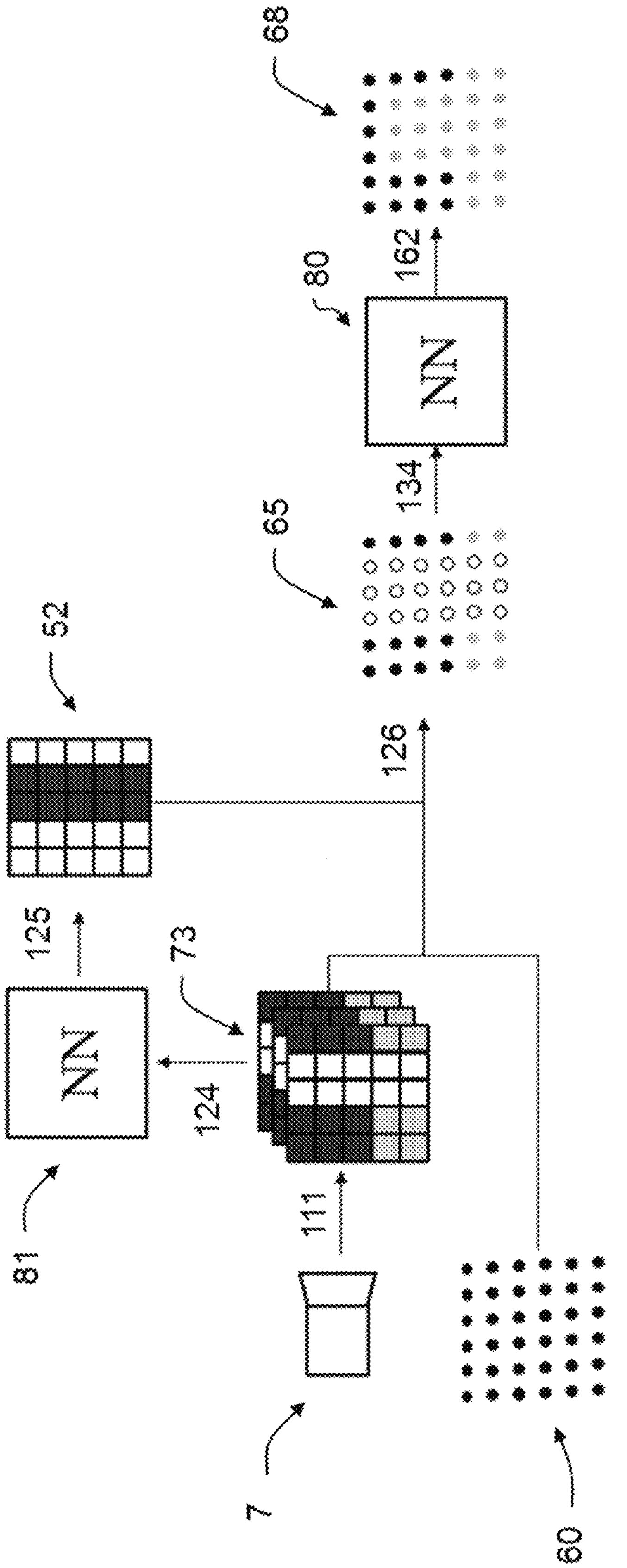
FIG. 8 illustrates a fourth exemplary embodiment of a method.

Optionally, a segmentation mask (not shown here) as described with respect to FIG. 8 may also be used with this embodiment: a mask value from this segmentation mask can be mapped onto the multi-channel image 74.

The multi-channel image 74 is input 131 to a neural network 80 or similar algorithm (for instance Generative Adversarial Networks or Denoising Diffusion Probabilistic Models) that is trained based on methods from machine learning, in particular by deep learning. The neural network 80 leverages the correlations between input RGB camera and LiDAR features and outputs 161 a corrected RGB colour per pixel where any significant content discrepancy or anomaly between RGB and LiDAR features is corrected before propagating the corrected RGB colour to the 3D point cloud as a three-channel in-painted image 78.

In other words, using an "image-based" approach as shown in FIG. 5, the method 100 of FIG. 4 may comprise:

1. acquiring 110 LiDAR and RGB data;
2. projecting 121 the LiDAR intensity values into the image-space (as the common aligned space);
3. identifying 130 pixels with content discrepancies or anomalies;
4. deriving 140, by the neural network, a synthetic RGB colour from joint evaluation of RGB and LiDAR features;
5. replacing 150 the raw RGB colour by the synthetic RGB colour in identified pixels of the image, generating an inpainted image as a result; and
6. (optionally) projecting 160 the colourising information to point cloud space to get an inpainted point cloud.

Figure 6:
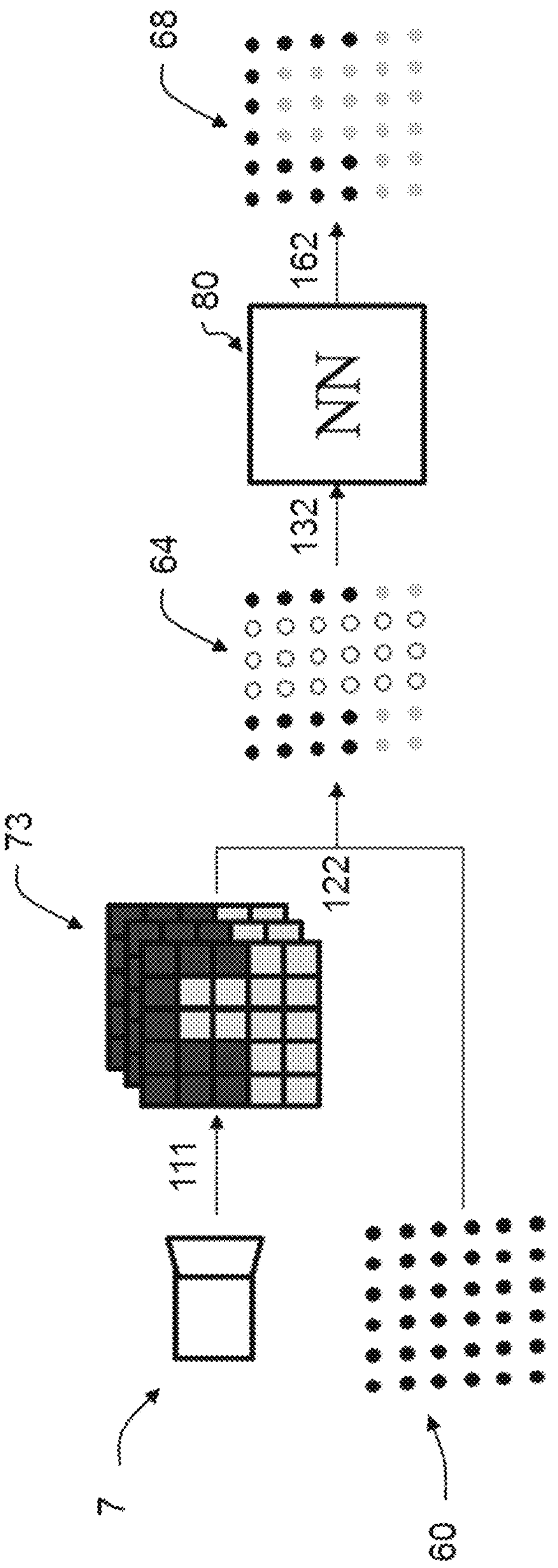
FIG. 6 illustrates a second exemplary embodiment of a method.

In the second embodiment illustrated in FIG. 6, the process comprises LiDAR-guided point cloud parallax inpainting, using the known geometric information to identify points affected by parallax. In contrast to the first embodiment, the process of the second embodiment may include computing and assigning a synthetic colour directly on the 3D point cloud space.

The RGB camera 7 provides 111 a three-channel RGB image 73 and the LiDAR unit provides scanning data as a point cloud 62 comprising coordinate and intensity values for each point.

The colour from the three-channel RGB image 73 is mapped 122 onto the points of the point cloud 62, generating a coloured point cloud 64. In case of obstructions due to the parallax between camera and LiDAR sensor, no colour can be assigned for some points. Those points are marked with an additional attribute (M). For instance, in case of a valid point attribute M may be set as 1, and if no colour is assigned attribute M may be set as 0. Each point of the coloured point cloud 64 is thus stored with eight values for the coordinates (X, Y, Z), the LiDAR intensity (I), the colour (R, G, B) and the attribute (M). This coloured point cloud 64 is input 132 to a point-cloud based neural network 80 or similar algorithm that assigns RGB colour to the points that had no assignment before, i.e. where M=0. This results in outputting 162 an in-painted point cloud 68 with six values (X, Y, Z, R, G, B) for each point.

In other words, using a "point-cloud-based" approach as shown in FIG. 6, the method 100 of FIG. 4 may comprise:

1. acquiring 110 LiDAR and RGB data;
2. projecting 122 the colour information into the point-cloud space (as the common aligned space);
3. identifying 130 points with content discrepancies or anomalies;
4. deriving 140, by the neural network, a synthetic RGB colour from joint evaluation of RGB and LiDAR features;
5. replacing 150 the raw RGB colour by the synthetic RGB colour in identified points of the point cloud, generating an inpainted point cloud as a result; and
6. (optionally) projecting 160 the colourising information to image space to get an inpainted image.

The colourising information is first assigned to the points in the point cloud space and the resulting colourized point cloud is then projected into the image space. The image space or camera space can be defined by a virtual camera, e.g. positioned at the LiDAR centre point.

Figure 7:
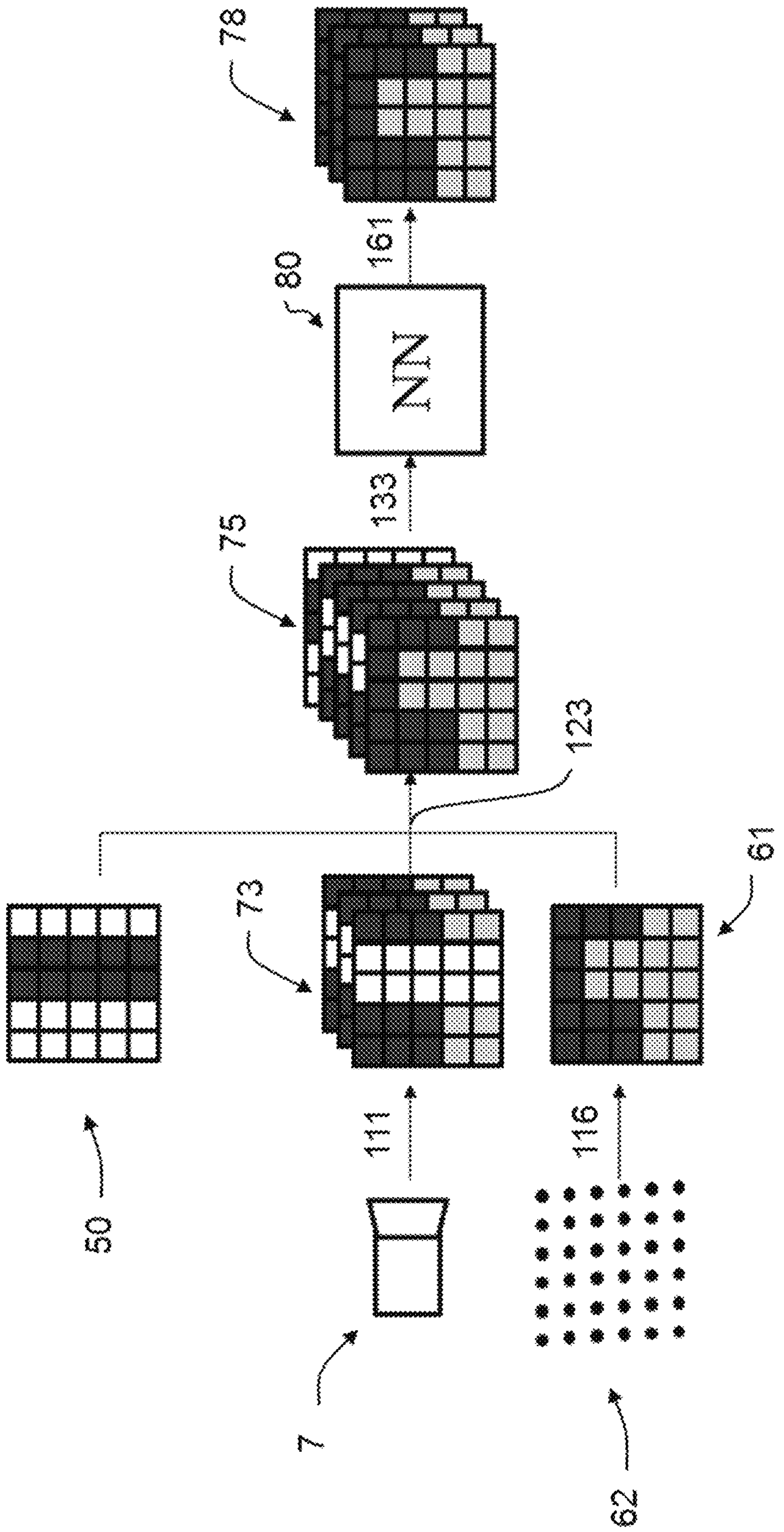
FIG. 7 illustrates a third exemplary embodiment of a method.

In the third embodiment illustrated in FIG. 7, the process comprises a masked inpainting approach. A LiDAR-guided inpainting algorithm is provided with a pre-generated mask 50 in which significant content discrepancies or anomalies between RGB and LiDAR features are identified. The proposed solution encodes this precomputed inpainting mask 50 as complementary input and integrates this feature as an additional attribute value M (e.g. valid pixel=1; invalid pixel=0) with available RGB and LiDAR features.

The RGB camera 7 provides 111 a three-channel RGB image 73 and the LiDAR unit provides scanning data with intensity values 62, from which a one-channel intensity image 61 is generated 116 by means of projection.

The colour and intensity from the images 73, 61 as well as the provided inpainting mask 50 are mapped 123 onto a 2D multichannel image representation 75. Each pixel in this representation is then stored with five values including the colour (R, G, B), the LiDAR intensity (I) and the mask value (M). Optionally, the mask value can also be encoded in the RGB values of the resulting multichannel image 75, i.e. by setting the RGB values of all masked pixels to a predefined value, e.g. to −1. The multichannel image 75 is input 133 to a neural network 80 or similar algorithm, e.g. Generative Adversarial Networks or Denoising Diffusion Probabilistic Models, which is trained based on methods from machine learning, in particular by deep learning. The output 161 of this process is a synthetic colour to in-paint the masked pixels, thus generating a three-channel in-painted image 78, before propagating the corrected RGB colour to the 3D point cloud.

Optionally, a segmentation mask (not shown here) as described with respect to FIG. 8 may also be used with this embodiment: a second mask value from this segmentation mask can be mapped onto the multi-channel image 74.

In the fourth embodiment illustrated in FIG. 8, the process comprises an automatic segmentation of potential anomalies or artifacts. It is based on the idea of complementing the LiDAR-guided inpainting algorithm with an additional algorithm 81 for the automated creation of a segmentation mask 52 in which potential content discrepancies or anomalies between RGB camera and LiDAR features are identified.

The RGB camera 7 provides 111 a three-channel RGB image 73 and the LiDAR unit provides scanning data as a point cloud 60 comprising coordinate and intensity values for each point.

The RGB image 73 is used as input 124 for the image-segmentation neural network 81 or similar algorithm that is trained based on methods from deep learning. The neural network 81 outputs 125 the pixel-level likelihood of a potential anomaly or artifact, i.e. moving obstacles, as a segmentation mask 52. This segmentation mask is encoded as complementary input and integrates this feature as an additional attribute (mask value) M (e.g. valid pixel=1; invalid pixel=0) with the available RGB features of the RGB image 73. Both RGB and M features are mapped 126 onto the LiDAR point cloud 60. Each point of the resulting coloured point cloud 65 is then stored with eight values (X, Y, Z, I, R, G, B, M), i.e. the 3D coordinates, the LiDAR intensity, the colour and the mask value.

This point cloud is input 134 to a point-cloud based neural network 80 or similar algorithm that assigns colours to those points that had no assignment before. This results in an in-painted point cloud 68 with six values (X, Y, Z, R, G, B) for each point as output 162.

Optionally, the segmentation mask 52 described here with respect to the fourth embodiment may also be used with the other embodiments. In particular, the mask values of the segmentation mask 52 can be mapped onto the multi-channel images 74, 75 of the first and third embodiments, thereby adding a further channel to these images.

Although aspects are illustrated above, partly with reference to some preferred embodiments, it must be understood that numerous modifications and combinations of different features of the embodiments can be made. All of these modifications lie within the scope of the appended claims.

The invention claimed is:

1. A computer-implemented method for colorizing a three-dimensional point cloud of a setting, the method comprising:

acquiring point cloud data and image data of the setting, wherein: the point cloud data comprises coordinates and an intensity value for each point of the three-dimensional point cloud, and the image data is acquired by a digital camera and provides color information of the setting;

combining the intensity values and the color information in a common aligned space by generating a multi-channel representation comprising RGB camera features and LiDAR features, wherein the RGB camera features are derived from the image data, and the LiDAR features are derived from the point cloud data, the LiDAR features comprising at least the intensity values;

identifying, by a first neural network, points of the point cloud data and/or pixels in the image data that are affected by content discrepancies or anomalies between the color information and the point cloud data, wherein the first neural network identifies the points and/or pixels by leveraging correlations between the RGB camera features and the LiDAR features in the multi-channel representation, wherein the content discrepancies or anomalies comprise incorrectly assigned color caused by at least one of shadows, reflections, overexposures and underexposures;

deriving, by the first neural network, for each of the identified points and/or pixels, colorizing information comprising corrected RGB color from joint evaluation of the RGB camera features and the LiDAR features; and assigning to each of the identified points and/or pixels, the respective colorizing information.

2. The method according to claim 1, comprising projecting the assigned colorizing information to point-cloud and/or camera spaces.

3. The method according to claim 1, wherein the point cloud data and the image data of the setting are acquired with a surveying instrument comprising a LiDAR unit and at least one digital camera, in particular wherein the method is performed by a computer of the surveying instrument, the computer comprising the first neural network, particularly wherein the computer is configured to control the LiDAR unit and the at least one digital camera.

4. The method according to claim 1, wherein:

the image data is acquired as a three-channel RGB image;

combining the intensity values and the color information in a common aligned space comprises generating a one-channel intensity image by means of projection of the intensity values;

the multi-channel representation is generated as a multi-channel image by adding the one-channel intensity image as an additional channel to the three-channel RGB image; and the multi-channel image is input to the first neural network, wherein pixels that are affected by content discrepancies or anomalies are identified based on the multi-channel image, wherein:

a mask value is encoded for a subset of pixels of the three-channel RGB image, the mask value indicating a presence of significant content discrepancies or anomalies between the color information and the point cloud data; and/or the assigned colorizing information is projected to point-cloud and/or camera spaces by outputting a three-channel in-painted image.

5. The method according to claim 4, wherein a precomputed inpainting mask is provided, the precomputed inpainting mask provides a mask value for a subset of pixels of the three-channel RGB image, the mask value indicating a presence of significant content discrepancies or anomalies between the color information and the point cloud data;

the multi-channel image is generated by adding the one-channel intensity image and the precomputed inpainting mask as additional channels to the three-channel RGB image, wherein the multi-channel image is input to the first neural network; and wherein the pixels that are affected by content discrepancies or anomalies are identified based on the mask values.

6. The method according to claim 1, wherein combining the intensity values and the color information in a common aligned space comprises generating a colored point cloud by mapping color information from the image data, particularly from a three-channel RGB image, onto the points of the point cloud; and the colored point cloud is input to the first neural network, wherein identifying the points is based on the colored point cloud, particularly wherein the assigned colorizing information is projected to point-cloud and/or camera spaces by outputting an in-painted point cloud.

7. The method according to claim 6, wherein the color information from the image data, particularly from a three-channel RGB image, is input to a second neural network, the second neural network being an image-segmentation neural network;

the second neural network outputs a segmentation mask;

combining the intensity values and the color information in a common aligned space comprises generating a colored point cloud by mapping the color information from the image data and the segmentation mask onto the points of the point cloud, wherein the colored point cloud is input to the first neural network;

the segmentation mask provides a mask value for each pixel of the image data, the mask value indicating a likelihood for the presence of significant content discrepancies or anomalies between the color information and the point cloud data, particularly from moving obstacles; and points that are affected by content discrepancies or anomalies are identified based on the mask values.

8. The method according to claim 6, wherein the colored point cloud comprises, for each point, at least three-dimensional coordinates, an intensity value and RGB color information, particularly wherein the colored point cloud further comprises, for each point, a mask value of an inpainting mask.

9. The method according to claim 7, wherein the colored point cloud comprises, for each point, at least three-dimensional coordinates, an intensity value and RGB color information, particularly wherein the colored point cloud further comprises, for each point, a mask value of an inpainting mask.

10. The method according to claim 1, wherein:

the point cloud data comprises a signal-to-noise-ratio value for each point of the three-dimensional point cloud; and the first neural network identifies the points of the point cloud data that are affected by content discrepancies or anomalies also based on the signal-to-noise-ratio values; and/or derives the colorizing information from joint evaluation of the projected coordinates, intensity values, color information and signal-to-noise-ratio values.

11. The method according to claim 1, wherein the first neural network identifies the points of the point cloud data and/or the pixels in the image data that are affected by the content discrepancies or anomalies after acquisition of the image data and after generation of the multi-channel representation.

12. A computer system configured for colorizing a three-dimensional point cloud of a setting, comprising:

a surveying instrument comprising a LiDAR unit and at least one digital camera, the surveying instrument being configured to acquire point cloud data and image data of the setting; and a computer that comprises a first neural network and is configured to perform the method according to claim 1.

13. The computer system according to claim 12, wherein the computer is a computer of the surveying instrument and configured to control the LiDAR unit and the at least one digital camera.

14. A computer program product comprising program code which is stored on a non-transitory machine-readable medium, and having computer-executable instructions for performing, when executed in a computer system, the method according to claim 1.

15. A computer-implemented method for colorizing a three-dimensional point cloud of a setting, the method comprising:

acquiring point cloud data and image data of the setting, wherein the point cloud data comprises coordinates and an intensity value for each point of the three-dimensional point cloud, and the image data is acquired by a digital camera and provides color information of the setting;

inputting the color information from the image data to an image-segmentation neural network;

outputting, by the image-segmentation neural network, a segmentation mask comprising mask values, the mask values indicating likelihoods for the presence of potential content discrepancies or anomalies between the color information and the point cloud data, the color information comprising RGB camera features and the point cloud data comprising LiDAR features;

combining the intensity values and the color information in a common aligned space by generating a colored point cloud, wherein the color information from the image data and the mask values of the segmentation mask are mapped onto points of the three-dimensional point cloud, and wherein the colored point cloud comprises, for each point, at least three-dimensional coordinates, an intensity value, mapped color information and a mapped mask value;

identifying points of the point cloud data, which are affected by content discrepancies or anomalies between the color information and the point cloud data, wherein the identifying is based on the mapped mask values of the colored point cloud;

inputting the colored point cloud to a color restoration neural network, the color restoration neural network deriving, for each of the identified points, colorizing information from joint evaluation of at least the three-dimensional coordinates, the intensity values, the mapped color information and the mapped mask values of the colored point cloud; and assigning to each of the identified points the respective colorizing information, thereby outputting an in-painted point cloud.

16. The method according to claim 15, wherein each point of the colored point cloud that is input to the color restoration neural network comprises at least X, Y and Z coordinates, a LiDAR intensity value, RGB color values and the mapped mask value.

17. The method according to claim 15, wherein the color restoration neural network outputs, for each identified point, replacement RGB values while retaining the three-dimensional coordinates of the identified point, thereby generating the in-painted point cloud.

18. The method according to claim 15, wherein the point cloud data and the image data of the setting are acquired with a surveying instrument comprising a LiDAR unit and at least one digital camera, wherein:

acquiring the point cloud data of the setting comprises acquiring point cloud data of a first portion of the setting, wherein a line of sight of the digital camera to the first portion is blocked when acquiring the image data; and points of the point cloud data that have been acquired in the first portion are identified as points of the point cloud data that are affected by content discrepancies or anomalies between the color information and the point cloud data.

19. The method according to claim 18, wherein the LiDAR unit and the digital camera are provided at different locations on the surveying instrument, wherein the line of sight of the digital camera to the first portion of the setting is blocked due to the different locations or due to a parallax shift between an instrument center of the LiDAR unit and a projection center of the digital camera.

20. The method according to claim 18, wherein the point cloud data and the image data of the setting are acquired sequentially, wherein the line of sight of the digital camera to the first portion of the setting is blocked due to a moving object or person constituting an obstruction between the camera and the setting.

* * * * *